Jan. 29, 1929.
L. A. DOUGHTY
1,700,123
HANDLE CONSTRUCTION FOR STORAGE BATTERY BOXES
Filed June 9, 1926
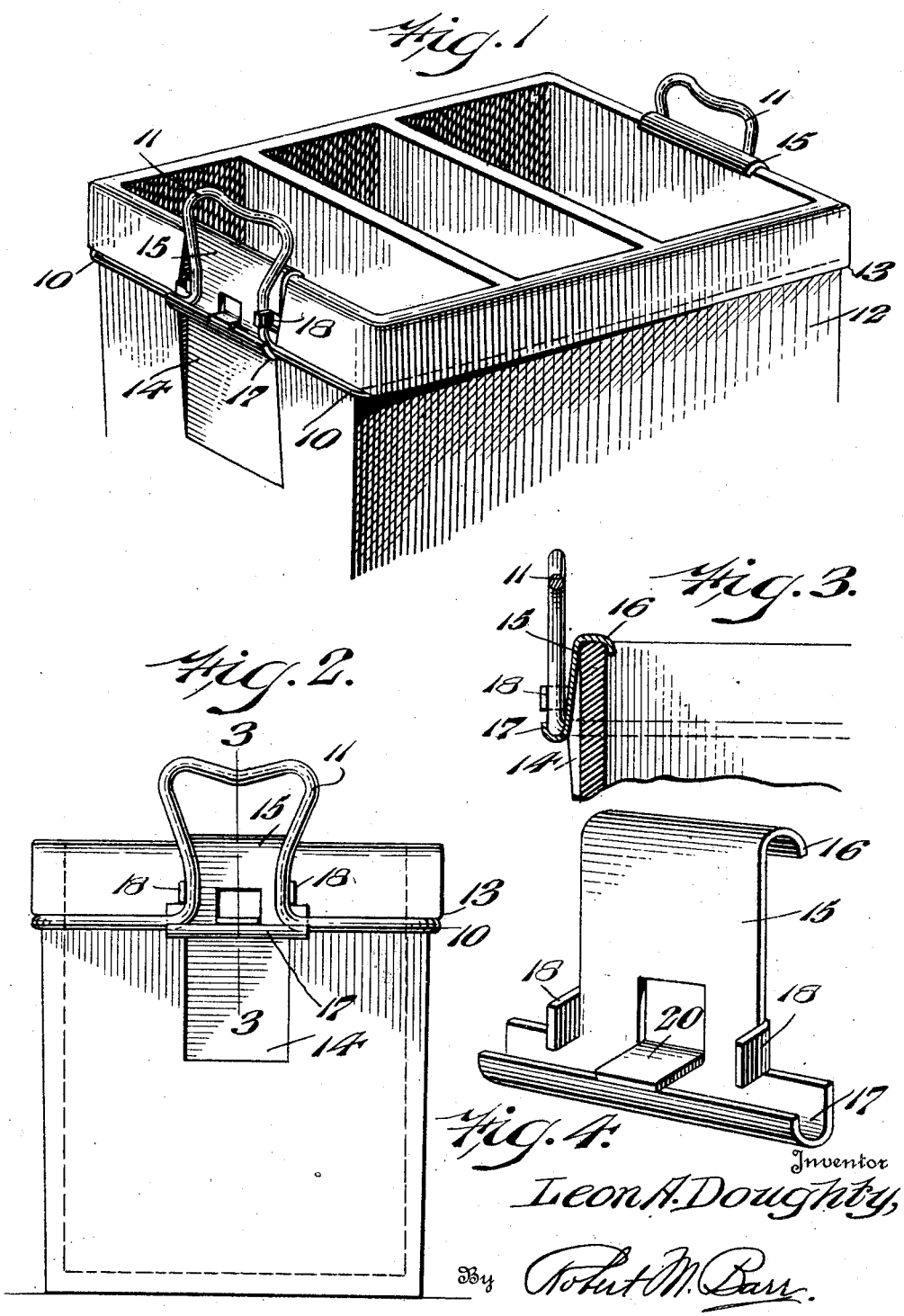
Inventor
Leon A. Doughty,
By Robert M. Barr.
Attorney Patented Jan. 29, 1929.

1,700,123

UNITED STATES PATENT OFFICE.

LEON A. DOUGHTY, OF GLENSIDE, PENNSYLVANIA.

HANDLE CONSTRUCTION FOR STORAGE-BATTERY BOXES.

Application filed June 9, 1926. Serial No. 114,756.

The present invention relates to handles or lifting devices for boxes or the like, and more particularly to a removable handle for storage battery boxes.

Some of the objects of the present invention are to provide an improved holder for lifting and transporting storage battery boxes; to provide an improved handle attaching means for storage battery boxes; to provide a removable device for battery boxes whereby shipment of such boxes is facilitated; to provide a handle structure for battery boxes whereby side and end warping of such boxes is prevented; to provide a simple, easily attachable handle mechanism for battery boxes; and to provide other improvements as will hereinafter appear.

In the accompanying drawings Fig. 1 represents a perspective of a portion of a storage battery box equipped with one form of the present invention; Fig. 2 represents an end elevation of the same; Fig. 3 represents a section on line 3—3 of Fig. 2; and Fig. 4 represents a perspective of one form of handle plate.

Referring to the drawings, one form of the present invention consists of a holder 10, preferably in the form of a wire of relatively stiff material having some natural resilience, which is formed at two opposite ends with upturned handles 11 so that in assembled condition the holder 10 with its box 12 can be conveniently lifted or carried. The holder 10 is shaped to conform to the contour of the battery box to which it is to be attached and is therefore generally of rectangular form with the handles 11 at the short sides, and the box receiving opening is of a size to fit snugly about the outside of the box and abut an outstanding shoulder 13 provided about the top portion of the box.

In order that the holder 10 can be readily fitted to the box 12 by slipping it over the bottom of the latter, the walls of the box 12 converge slightly downwardly so that the marginal dimensions of the bottom are less than the dimensions of the opening of the holder 10. Thus the holder 10 can be easily placed about the bottom portion of the box and then drawn up snug against the projecting shoulder 13.

For anchoring the holder 10 in its operative position the ends of the box 12 are cut away respectively to form recesses 14 transverse to the shoulder portion of the box and in each of which a retaining plate 15 is fitted. Each of these plates 15 consists of a body part having a reversely turned end or hook part 16 at one end and a reversely turned portion at the other end forming a trough-like seat 17. In addition, the body part has two oppositely arranged lugs 18 projecting in the same direction and the spacing is such as to receive the width of a handle 11 so that when the holder 10 is in place with the handle parts sprung into the space between the lugs 18 it cannot loosen or spring outward under expansion or contraction of the box. A hold down tab 20 is preferably punched outwardly from the body 15 and provides a seat to receive the clamp by which batteries are anchored in the battery compartment of an automobile.

In placing the three part handle of the present invention in place one of the end retaining plates 15 is mounted upon one of the handles 11 by inserting the side members of the latter between the lugs 18 and the trough support 17 and when so placed the compression of the handle parts retains the parts together. The opposite retaining plate 15 is similarly engaged with the other handle member 11 and the assembled handle is then ready to receive the battery box. The bottom of the box is now placed within the enclosure formed by the holder 10 and one of the handles is drawn up at the end of the box to allow the hook part 16 of the retaining plate to be hooked over the top edge of the box where plate 15 then seats in the recess 14 provided. The opposite end of the handle is then drawn up by exerting a downward pressure on the box and an upward pull upon the handle 11. In this way the handle is brought to position where the retaining plate 15 can be snapped into place with its hook 16 over the other top edge of the box and as a result there is sufficient spring tension to prevent relative movement of the holder and secure it substantially in a permanent manner. Since the holder 10 encircles the box and is made fast against spreading action it will be apparent that any tendency of the box to warp or bend is resisted.

Having thus described my invention, I claim:

1. The combination of a box, stop means projecting exterior of said box, a holder formed of wire shaped to fit the contour of said box below said stop means, handles on said holder, and retaining plates attached to said box, each of said plates having a trough to fit under said wire and lugs at opposite sides for respectively engaging said handles.

2. The combination of a battery box provided with downwardly faced flanges respectively on its four sides, a holder forming two handles and having an opening to receive said box to bring said holder into lifting engagement with said flanges, plate members suspended from the top edge of said box at two opposite sides thereof, and means on said members for preventing said holder from flexing to become displaced from said flanges when in use.

Signed at Philadelphia, county of Philadelphia, State of Pennsylvania, this 5th day of June, 1926.

LEON A. DOUGHTY.